US009777845B2

(12) United States Patent
Krieger et al.

(10) Patent No.: US 9,777,845 B2
(45) Date of Patent: Oct. 3, 2017

(54) CONDUIT SLIDER FOR CHEMICAL AND PETROCHEMICAL SYSTEMS

(71) Applicant: Z&J Technologies GmbH, Dueren (DE)

(72) Inventors: Stefan Krieger, Inden/Altdorf (DE); Metin Gerceker, Staad (CH); Roland Travnicek, Dueren (DE)

(73) Assignee: Z&J Technologies GmbH, Dueren (DE)

( * ) Notice: Subject to any disclaimer, the term of this patent is extended or adjusted under 35 U.S.C. 154(b) by 0 days.

(21) Appl. No.: 15/129,106

(22) PCT Filed: Apr. 10, 2015

(86) PCT No.: PCT/EP2015/057812
§ 371 (c)(1),
(2) Date: Sep. 26, 2016

(87) PCT Pub. No.: WO2015/165712
PCT Pub. Date: Nov. 5, 2015

(65) Prior Publication Data
US 2017/0102079 A1    Apr. 13, 2017

(30) Foreign Application Priority Data

Apr. 29, 2014 (DE) .......... 10 2014 106 001

(51) Int. Cl.
*F16K 3/02* (2006.01)
*F16L 55/07* (2006.01)

(52) U.S. Cl.
CPC .......... *F16K 3/0227* (2013.01); *F16K 3/0218* (2013.01); *F16L 55/07* (2013.01)

(58) Field of Classification Search
CPC ....... F16K 3/0227; F16K 3/0218; F16L 55/07
(Continued)

(56) References Cited

U.S. PATENT DOCUMENTS 1,836,374 A * 12/1931 Kelly ...................... F16K 3/184
137/242
1,868,147 A * 7/1932 Kruse ..................... F16K 3/207
126/285 A
(Continued)

FOREIGN PATENT DOCUMENTS

DE  202004011575 U1  10/2004
EP     0512324 A1    11/1992
(Continued)

OTHER PUBLICATIONS

International Searching Authority, International Search Report (ISR) and Written Opinion for International Application No. PCT/EP2015/057812, dated Jul. 20, 2015, 13 pages, European Patent Office, The Netherlands.
(Continued)

*Primary Examiner* — John Bastianelli
(74) *Attorney, Agent, or Firm* — Alston & Bird LLP

(57) ABSTRACT

A conduit slider for chemical and petrochemical systems, comprising a slider housing (10) which has a blockable conduit (20) and at least one slider plate (30) which can be moved into an open position and a closed position and vice versa. A sealing seat (40) is paired with the conduit (20), said sealing seat extending along the circumference of the conduit (20) and sealing against the slider plate (30) at least in the closed position during operation. The conduit slider ensures the seal between the sealing seat (40) and the slider plate (30) and allows the slider plate (30) to be installed into and removed from the slider housing (10) with a compact, portable, simple, and inexpensive design. This is achieved in that at least one circumferential groove (42) is formed in the sealing seat (40), a molded metal ring (50) with a media filling being arranged in said groove.

11 Claims, 2 Drawing Sheets

(58) Field of Classification Search
USPC ........ 251/326–329, 193, 195, 175, 171–172, 251/174; 137/242, 246–246.12; 277/646
See application file for complete search history.

(56) References Cited

U.S. PATENT DOCUMENTS

| | | | | |
|---|---|---|---|---|
| 2,148,628 A | * | 2/1939 | Laurent | F16K 3/186 137/246 |
| 2,433,638 A | * | 12/1947 | Volpin | F16K 3/36 137/246.12 |
| 2,660,397 A | * | 11/1953 | Volpin | F16K 3/36 137/246.12 |
| 2,705,016 A | * | 3/1955 | Saar | F16K 1/228 137/1 |
| 3,050,077 A | | 8/1962 | Wheatley | |
| 3,367,625 A | | 2/1968 | Fortune | |
| 3,478,771 A | * | 11/1969 | Johnson | F16K 3/02 137/242 |
| 3,711,062 A | * | 1/1973 | Kirkwood | F16K 3/207 277/646 |
| 3,776,276 A | * | 12/1973 | Stiltner | F16K 11/0655 137/625.18 |
| 3,842,861 A | * | 10/1974 | Jandrasi | F16K 3/10 137/613 |
| 4,647,005 A | * | 3/1987 | Hunter | E21B 34/02 251/172 |
| 5,618,024 A | | 4/1997 | Westenberg | |
| 7,114,702 B2 | * | 10/2006 | Sauer | F16K 3/207 251/172 |
| 7,309,057 B2 | * | 12/2007 | Santiago | F16J 15/46 251/172 |
| 7,624,754 B2 | | 12/2009 | Brzoska et al. | |
| 9,416,881 B2 | | 8/2016 | Takeda et al. | |
| 2014/0231691 A1 | | 8/2014 | Takeda et al. | |

FOREIGN PATENT DOCUMENTS

| | | |
|---|---|---|
| EP | 0646742 A1 | 4/1995 |
| EP | 1561980 B1 | 4/2007 |
| FR | 2474131 A1 | 7/1981 |
| GB | 874169 A | 8/1961 |

OTHER PUBLICATIONS

German Patent and Trade Mark Office, First Office Action for Application No. 102014106001.6, dated Jan. 23, 2015, 5 pages, Germany.

* cited by examiner

CONDUIT SLIDER FOR CHEMICAL AND PETROCHEMICAL SYSTEMS

CROSS REFERENCE TO RELATED APPLICATIONS

This application is a national stage application, filed under 35 U.S.C. §371, of International Application No. PCT/EP2015/057812, filed Apr. 10, 2015, which claims priority to German Application No. 10 2014 106 001.6, filed Apr. 29, 2014, the contents of both of which as are hereby incorporated by reference in their entirety.

BACKGROUND

Technical Field

The invention relates to a conduit slider for chemical and petrochemical systems, comprising a slider housing which has a lockable conduit pipe and at least one slider plate which can be moved into an open position and a closed position and vice versa, wherein a sealing seat is associated with the conduit pipe, which sealing seat extends along the circumference of the conduit pipe and seals against the slider plate at least in the closed position during operation.

Description of Related Art

A conduit slider is known from the prior art. One example which is known from publication is represented by EP 1 561 980 B1. In this case, a conduit slider is disclosed for a coking drum with a slider housing, which comprises a lockable conduit pipe for connection with the coking drum and two slider plates. The slider plates can be moved to an open position and a closed position and vice versa. The conduit pipe is associated with an elastic element and a sealing seat, which form a portable seat unit which extends along the circumference of the conduit pipe, which can be connected to the slider housing and which seals against the slider plate at least in the closed position during operation.

It is a disadvantage in this known conduit slider that the sealing seat consists of several mutually connected or bolted individual components such as the elastic element, ring insert, guide ring and sealing ring for example. On the other hand, the dismounting and mounting of a slider plate in the slider housing is very time-consuming and expensive because every single component of the sealing seat needs to be dismounted and subsequently mounted again.

BRIEF SUMMARY

It is therefore the object of the present invention to provide a conduit slider for chemical and petrochemical systems which ensures the tightness between the sealing seat and the slider plate on the one hand and offers a compact, portable, simple and inexpensive possibility to install the slider plate in the slider housing and to dismount it therefrom on the other hand.

For the purpose of achieving the aforementioned object, a conduit slider for chemical and petrochemical systems with the features of the claims provided herewith. The conduit slider for chemical and petrochemical systems with a slider housing comprises a lockable and at least one slider plate. The slider plate can be moved to an open position and a closed position and vice versa. A sealing seat is associated with the conduit pipe. The sealing seat extends along the circumference of the conduit pipe and seals in operation against the slider plate at least in the closed position. At least one circumferential groove is formed in the sealing seat. A metallic shaped ring with a media filling is arranged therein.

A relevant item of the invention is thus that the conduit pipe is associated with a sealing seat having a circumferential groove in which a metallic shaped ring with media filling is arranged. In other words, a sealing seat by means of a metallic shaped ring is provided on the conduit pipe which seals the conduit pipe against the slider plate or a baffle. The circumferential groove can be formed in a surface of the sealing seat facing the slider plate. This allows direct sealing by means of the shaped ring between the sealing seat and the slider plate. The association of the sealing seat with the conduit pipe thus provides a conduit slider which ensures the tightness between the sealing seat and the slider plate. Individual components are saved by the configuration of the sealing seat in accordance with the invention and a compact, portable, simple and inexpensive possibility is thus offered to allow the mounting of the slider plate on the slider housing and the dismounting therefrom.

An elastic metal seal shall be understood as a metallic shaped ring with media filling. The media filling can consist of a solid or gaseous medium. This shaped ring offers the advantage that it can withstand both very high and also very low temperatures, high pressures, extreme negative pressures, aggressive chemicals and even intense radiation. It is possible to achieve optimal loading, springback and deformability as well as hardness for the greatest possible sealing effect by providing a purposeful selection of materials. Similarly, the running surface of the shaped ring can be electroplated, so that unnecessary parts can be omitted and potential causes of failures can be reduced.

It is especially advantageous if the shaped ring rests on the slider plate in the closed position. Sealing of the coking drum against the slider housing can thus be ensured in the closed state of the conduit slider. Sealing of the coking drum against the slider housing can also be ensured in the open state of the conduit slider in that the shaped ring also rests on the carrier plate in this position.

It is possible that the sealing seat additionally comprises a sealing ring. At least one circumferential groove is formed on the upper side of the sealing ring, in which the shaped ring is arranged. At least one sealing surface is arranged on the bottom side of the sealing ring, which sealing surface rests on the slider plate at least in the closed position. The directions "top" and "bottom" relate to the installation position of the slider. The longitudinal axis of the conduit pipe is oriented vertically in the installation position. The slider plate is displaced in the horizontal direction, i.e. a perpendicularly to the longitudinal axis of the conduit pipe. The upper side of the sealing ring is arranged opposite the bottom side of the sealing ring and represents the side which faces the conduit pipe. The side is defined as the bottom side of the sealing ring which faces the slider plate. In other words, the shaped ring is arranged between the conduit pipe and the sealing ring. The sealing ring seals with at least one sealing surface against the slider plate. The shaped ring produces the tightness between the conduit pipe and the sealing ring. The sealing surface of the sealing ring can comprise a sealing and scraper edge. The tightness between the sealing seat and the slider plate can be optimised even further by interposing a sealing ring between the conduit pipe and the slider plate. Sealing of the coking drum against the slider housing can also be ensured in the open state of the conduit slider in that in this position too the sealing surface of the sealing ring rests on the carrier plate. As a result of the selection of the correct size of the shaped ring, changes in the gap between the sealing seat and the slider plate or between the conduit pipe and the sealing ring which are caused by wear and tear for example can be intercepted optimally and optimal sealing can thus be ensured.

The sealing seat preferably comprises a single-acting static sealing system which interacts with the slider plate. Said single-acting sealing system can consist of a shaped ring for example. It is similarly possible that said single-acting sealing system consists of a sealing ring in which a shaped ring is arranged. The sealing seat can further comprise one at least double-acting, especially triple-acting or multiple-acting, static sealing system which interacts the slider plate. Said double-acting, triple-acting or multiple-acting sealing system can comprise further seals in addition to the shaped ring or the sealing ring in which a shaped ring is arranged in order to further improve the tightness between the conduit pipe or the sealing seat and the slider plate.

Furthermore, the sealing seat can further preferably comprise a radially inwardly arranged sealing and scraper edge and a gas barrier, especially a vapour barrier, which is formed between the radially outwardly arranged shaped ring and the radially inwardly arranged sealing and scraper edge. The sealing and scraper edge and the gas barrier, and the vapour barrier in particular, are also arranged like the shaped ring in the surface of the sealing seat facing the slider plate. The tightness between the sealing seat in the slider plate can be optimised even further by this arrangement of the different seals on the sealing seat. A leakage in form of liquid or gaseous exchange of material between the coking drum and the slider housing can thus be minimised even further. It is similarly possible that a radially outwardly arranged sealing ring is arranged instead of the radially outwardly arranged shaped ring, wherein at least one circumferential groove is formed on the upper side of the sealing ring in which the shaped ring is arranged, and at least one sealing surface is arranged on the bottom side of the sealing ring.

The shaped ring can preferably be pressed into the circumferential groove of the sealing seat. The shaped ring can also be pressed into the circumferential groove of the sealing ring. A secure hold of the shaped ring in the sealing seat is ensured by pressing the shaped ring into the circumferential groove. Similarly, the pressing of the shaped ring in the circumferential groove can further be optimised by the media filling. The differential pressure applied internally or externally by the media filling improves the pressing force of the seal or the shaped ring in the circumferential groove.

Furthermore, the sealing seat can preferably comprise two concentric circumferential grooves in which a respective shaped ring is arranged. Similarly, the sealing ring associated with the sealing seat can comprise two concentric circumferential grooves in which a respective shaped ring is arranged. The sealing effect of the sealing seat is improved even further by arranging two concentric circumferential grooves in which a respective shaped ring is arranged. Two shaped rings which are arranged on the sealing ring also increase the stability within the sealing seat in addition to improved tightness.

The shaped ring can preferably consist of an O-ring with a gas filling. Said O-ring offers very good properties against environmental and operational influences such as temperatures, pressure, chemicals or radiation. As a result of a purposeful selection of the material of the O-ring, optimal loading, springback and deformability as well as hardness can be achieved for the greatest possible sealing effect of the O-ring.

It is also possible that the shaped ring consists of a C-ring with an elastic element arranged therein. The C-ring can consist of a metal. The elastic element is arranged in the interior of the C-ring and can consist of a resilient material for example. A C-ring with an elastic element shows good restoring properties. It is used as an additional pressure support for the sealing, which is achieved by jacket and spring forces as well as system pressure. A further possibility as a shaped ring is offered by the C-ring with an elastic element in order to ensure optimal tightness between the conduit pipe or sealing seat and the slider plate.

The conduit slider can preferably be formed as a double-plate slider with two parallel slider plates.

The conduit slider can also preferably be formed as a single-plate slider with a single slider plate.

BRIEF DESCRIPTION OF THE FIGURES

The invention will be explained below in closer detail by reference to the drawings, wherein.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Figure 1:
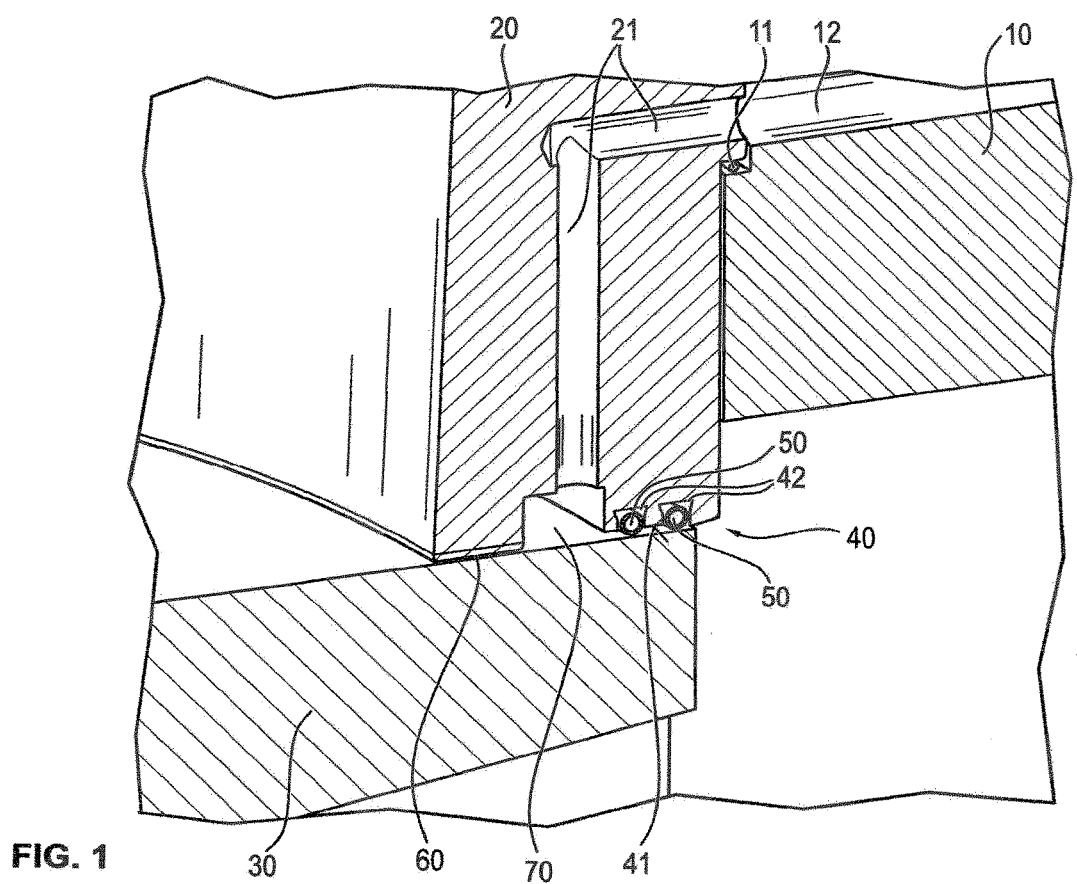
FIG. 1 shows a cross-sectional view of a conduit slider according to an embodiment.

The conduit slider according to FIG. 1 is used in coking systems, especially in delayed coking plants, in which coking drum is provided with shut-off members. Specifically, the conduit slider shown in FIG. 1 is used for closing the bottom outlet opening (bottom de-heading) of a coking drum (also: coke drum). It is also possible to use the concept in accordance with the invention which is realised in the conduit slider according to FIG. 1 in a shut-off member which is used for opening and closing the upper outlet opening of the coking drum (top de-heading). Furthermore, the concept in accordance with the invention or the invention in general can be used in connection with shut-off members which are used in other industrial fields such as ethylene, FCCU, phosgene, etc. The conduit slider according to the embodiment in accordance with the invention or the invention in general can generally be used as a shut-off member in chemical and petrochemical plants.

FIG. 1 shows a conduit pipe for chemical and petrochemical plants, especially for a cooking drum, comprising a slider housing 10. The conduit slider comprises a lockable conduit pipe 20. The conduit slider further comprises a slider plate 30. The slider plate 30 can be moved to an open position and a closed position and vice versa. The conduit pipe 20 represents a circular pipe. The slider plate 30 or baffle also has a circular geometry. Other shapes of the slider plate are also possible. The slider plate can thus be formed in an integral and rectangular manner for example.

The conduit pipe 20 is sealed by means of a sealing element 11 against slider housing 10. Furthermore, a sealing seat 40 is associated with the conduit pipe 20. The sealing seat 40 extends along the circumference of the conduit pipe 20 and seals the conduit pipe 20 against the slider plate 30 at least in the closed position in operation.

The sealing seat 40 comprises a surface 41. Said surface 41 is arranged on the side of the sealing seat 40 which faces the slider plate 30. Two circumferential grooves 42 are formed in said surface 41. One metallic shaped ring 50 each is arranged in the two circumferential grooves 42. The shaped ring 50 is filled with a medium such as gas for example. The shaped ring 50 rests on the slider plate 30 at least in the closed position and thus seals the conduit pipe 20 against slider plate 30. Sealing of the coking drum against the slider housing 10 can also be ensured in the open state of the conduit slider in that the shaped ring 50 rests on the slider plate 20 in this position too.

The shaped ring 50 is a metallic O-ring in the illustrated example. Said metallic O-ring is pressed into the circumferential groove 42. A secure hold of the shaped ring 50 in the circumferential groove 42 is ensured by this pressing. The metallic O-ring is further filled with a medium, in this specific embodiment with a gas. As a result of this filling with a pressurised gas, the pressing of the shaped ring 50 in the circumferential groove 42 is optimised even further. The differential pressure applied internally or externally by means of the media filling improves the pressing force of the seal or the shaped ring 50 in the circumferential groove 42.

The two shaped rings 50 are arranged radially on the outside on the sealing seat 40. The sealing seat 40 further comprises a radially inwardly arranged sealing and scraper edge 60. Said sealing and scraper edge 60 also rests on the slider plate 30 at least in the closed position and thus also seals the conduit pipe 20 against the slider plate 30. A gas barrier, and a vapour barrier 70 particular, is further formed between the radially outwardly arranged shaped rings 50 and the radially inwardly arranged sealing and scraper edge 60. A flushing and sealing steam channel 21 is arranged within the conduit pipe 20. A flushing and sealing steam channel 12 is arranged within the slider housing 10. The two flushing and sealing steam channels 12, 21 are coupled to each other. This gas barrier, and vapour barrier 70 in particular, is connected by the two flushing and sealing steam channels 12, 21 to a flushing and sealing steam source.

Figure 2:
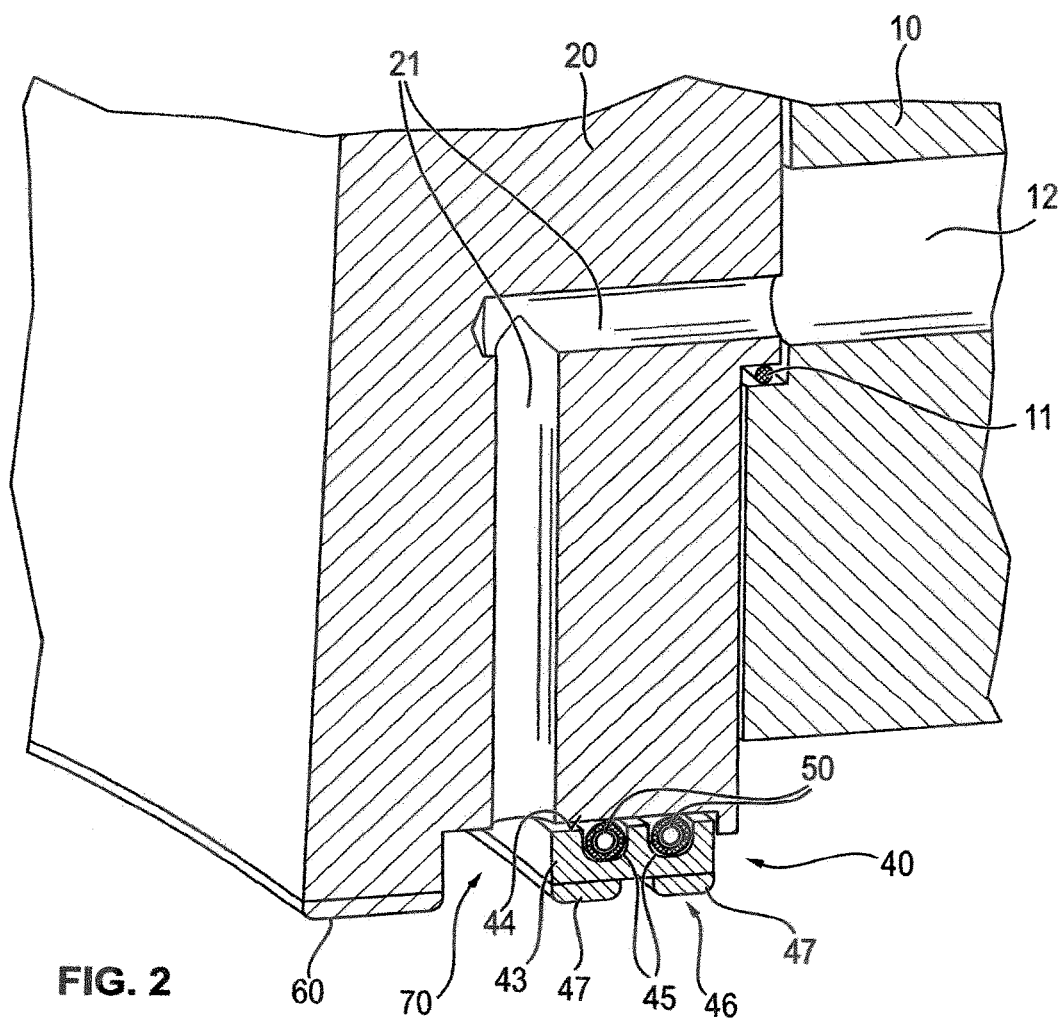
FIG. 2 shows a cross-sectional view of a conduit slider according to a further embodiment.

FIG. 2 shows a further embodiment of a conduit slider in accordance with the invention. The principal configuration of the conduit slider in FIG. 2 corresponds to that of the conduit slider which is shown in FIG. 1. Only the sealing seat 40 comprises an additional sealing ring 43.

The sealing ring 43 has an upper side 44 and a bottom side 46. The side is defined as the bottom side 46 of the sealing ring 43 which is associated with the slider plate 30. The upper side 44 of the sealing ring 43 is arranged opposite the bottom side 46 of the sealing ring 43. The upper side 44 faces the conduit pipe 20. Two sealing surfaces 47 are arranged on the bottom side 46 of the sealing ring 43. The sealing surfaces 47 rest on the slider plate 30 at least in the closed position. Sealing of the coking drum against the slider housing 10 can also be ensured in the open state of the conduit slider in that the two sealing surfaces 47 rest on the slider plate 20 in this position too. The sealing surface 47 of the sealing ring 43 can comprise a sealing and scraper edge.

Two circumferential grooves 45 are formed on the upper side 44 of the sealing ring 43. One shaped ring 50 each is arranged in these circumferential grooves 45. The shaped ring 50 rests on the one hand on the sealing ring 43 and on the other hand on the conduit pipe 20. The shaped rings 50 are two metallic O-rings in this embodiment too. Said metallic O-rings are pressed into the circumferential grooves 45. A secure hold of the shaped rings 50 in the circumferential grooves 45 is ensured by these pressings. The metallic O-rings are further filled with a medium, in this specific embodiment with a gas. The pressings of the shaped rings 50 in the circumferential grooves 45 are further optimised by said the pressurised gas filling. The differential pressure applied internally or externally by means of the media filling improves the pressing force of the sealing or shaped rings 50 in the circumferential grooves 45.

A relevant item of the invention is thus that the conduit pipe is associated with a sealing seat having a circumferential groove in which a metallic shaped ring with media filling is arranged. In other words, a sealing seat by means of a metallic shaped ring is provided on the conduit pipe which seals the conduit pipe against the slider plate or a baffle. The circumferential groove can be formed in a surface of the sealing seat facing the slider plate. This allows direct sealing by means of the shaped ring between the sealing seat and the slider plate. The association of the sealing seat with the conduit pipe thus provides a conduit slider which ensures the tightness between the sealing seat and the slider plate. Individual components are saved by the configuration of the sealing seat in accordance with the invention and a compact, portable, simple and inexpensive possibility is thus offered to allow the mounting of the slider plate on the slider housing and the dismounting therefrom.

An elastic metal seal shall be understood as a metallic shaped ring with media filling. The media filling can consist of a solid or gaseous medium. This shaped ring offers the advantage that it can withstand both very high and also very low temperatures, high pressures, extreme negative pressures, aggressive chemicals and even intense radiation. It is possible to achieve optimal loading, springback and deformability as well as hardness for the greatest possible sealing effect by providing a purposeful selection of materials. Similarly, the running surface of the shaped ring can be electroplated, so that unnecessary parts can be omitted and potential causes of failures can be reduced.

It is especially advantageous if the shaped ring rests on the slider plate in the closed position. Sealing of the coking drum against the slider housing can thus be ensured in the closed state of the conduit slider. Sealing of the coking drum against the slider housing can also be ensured in the open state of the conduit slider in that the shaped ring also rests on the carrier plate in this position.

It is possible that the sealing seat additionally comprises a sealing ring. At least one circumferential groove is formed on the upper side of the sealing ring, in which the shaped ring is arranged. At least one sealing surface is arranged on the bottom side of the sealing ring, which sealing surface rests on the slider plate at least in the closed position. The directions "top" and "bottom" relate to the installation position of the slider. The longitudinal axis of the conduit pipe is oriented vertically in the installation position. The slider plate is displaced in the horizontal direction, i.e. a perpendicularly to the longitudinal axis of the conduit pipe. The upper side of the sealing ring is arranged opposite the bottom side of the sealing ring and represents the side which faces the conduit pipe. The side is defined as the bottom side of the sealing ring which faces the slider plate. In other words, the shaped ring is arranged between the conduit pipe and the sealing ring. The sealing ring seals with at least one sealing surface against the slider plate. The shaped ring produces the tightness between the conduit pipe and the sealing ring. The sealing surface of the sealing ring can comprise a sealing and scraper edge. The tightness between the sealing seat and the slider plate can be optimised even further by interposing a sealing ring between the conduit pipe and the slider plate. Sealing of the coking drum against the slider housing can also be ensured in the open state of the conduit slider in that in this position too the sealing surface of the sealing ring rests on the carrier plate. As a result of the selection of the correct size of the shaped ring, changes in the gap between the sealing seat and the slider plate or between the conduit pipe and the sealing ring which are caused by wear and tear for example can be intercepted optimally and optimal sealing can thus be ensured.

The sealing seat preferably comprises a single-acting static sealing system which interacts with the slider plate. Said single-acting sealing system can consist of a shaped ring for example. It is similarly possible that said single-acting sealing system consists of a sealing ring in which a shaped ring is arranged. The sealing seat can further comprise one at least double-acting, especially triple-acting or multiple-acting, static sealing system which interacts the slider plate. Said double-acting, triple-acting or multiple-acting sealing system can comprise further seals in addition to the shaped ring or the sealing ring in which a shaped ring is arranged in order to further improve the tightness between the conduit pipe or the sealing seat and the slider plate.

Furthermore, the sealing seat can further preferably comprise a radially inwardly arranged sealing and scraper edge and a gas barrier, especially a vapour barrier, which is formed between the radially outwardly arranged shaped ring and the radially inwardly arranged sealing and scraper edge. The sealing and scraper edge and the gas barrier, and the vapour barrier in particular, are also arranged like the shaped ring in the surface of the sealing seat facing the slider plate. The tightness between the sealing seat in the slider plate can be optimised even further by this arrangement of the different seals on the sealing seat. A leakage in form of liquid or gaseous exchange of material between the coking drum and the slider housing can thus be minimised even further. It is similarly possible that a radially outwardly arranged sealing ring is arranged instead of the radially outwardly arranged shaped ring, wherein at least one circumferential groove is formed on the upper side of the sealing ring in which the shaped ring is arranged, and at least one sealing surface is arranged on the bottom side of the sealing ring.

The shaped ring can preferably be pressed into the circumferential groove of the sealing seat. The shaped ring can also be pressed into the circumferential groove of the sealing ring. A secure hold of the shaped ring in the sealing seat is ensured by pressing the shaped ring into the circumferential groove. Similarly, the pressing of the shaped ring in the circumferential groove can further be optimised by the media filling. The differential pressure applied internally or externally by the media filling improves the pressing force of the seal or the shaped ring in the circumferential groove.

Furthermore, the sealing seat can preferably comprise two concentric circumferential grooves in which a respective shaped ring is arranged. Similarly, the sealing ring associated with the sealing seat can comprise two concentric circumferential grooves in which a respective shaped ring is arranged. The sealing effect of the sealing seat is improved even further by arranging two concentric circumferential grooves in which a respective shaped ring is arranged. Two shaped rings which are arranged on the sealing ring also increase the stability within the sealing seat in addition to improved tightness.

The shaped ring can preferably consist of an O-ring with a gas filling. Said O-ring offers very good properties against environmental and operational influences such as temperatures, pressure, chemicals or radiation. As a result of a purposeful selection of the material of the O-ring, optimal loading, springback and deformability as well as hardness can be achieved for the greatest possible sealing effect of the O-ring.

It is also possible that the shaped ring consists of a C-ring with an elastic element arranged therein. The C-ring can consist of a metal. The elastic element is arranged in the interior of the C-ring and can consist of a resilient material for example. A C-ring with an elastic element shows good restoring properties. It is used as an additional pressure support for the sealing, which is achieved by jacket and spring forces as well as system pressure. A further possibility as a shaped ring is offered by the C-ring with an elastic element in order to ensure optimal tightness between the conduit pipe or sealing seat and the slider plate.

The conduit slider can preferably be formed as a double-plate slider with two parallel slider plates. The conduit slider can also preferably be formed as a single-plate slider with a single slider plate.

It will be appreciated that many variations of the inventive conduit slider are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE NUMERALS

10 Slider housing
11 Sealing element
12 Flushing and sealing steam channel
20 Conduit pipe
21 Flushing and sealing steam channel
30 Slider plate
40 Sealing seat
41 Surface
42 Circumferential groove
43 Sealing ring
44 Upper side
45 Circumferential groove
46 Bottom side
47 Sealing surface
50 Shaped ring
60 Sealing and scraper edge
70 Gas barrier, especially vapour barrier

The invention claimed is:

1. A conduit slider for chemical and petrochemical systems, said conduit slider comprising:
   a slider housing (10) having a lockable conduit pipe (20); and
   at least one slider plate (30) movable into an open position and a closed position and vice versa,
   wherein:
      a sealing seat (40) is associated with the conduit pipe (20),
      the sealing seat extends along the circumference of the conduit pipe (20) and seals against the slider plate (30) at least in the closed position during operation, at least one circumferential groove (42) is formed in the sealing seat (40) in which a metallic shaped ring (50) with media filling is arranged the sealing seat (40) comprises a radially inwardly arranged sealing and scraper edge (60) and a gas barrier, which is formed between the radially outwardly arranged shaped ring (50) and the radially inwardly arranged sealing and scraper edge (60).

2. A conduit pipe according to claim 1, wherein the shaped ring (50) rests on the slider plate (30) in the closed position.

3. A conduit pipe according to claim 1, wherein:

the sealing seat (40) comprises a sealing ring (43), at least one circumferential groove (45) is formed on the upper side (44) of the sealing ring (43) in which the shaped ring is arranged (50), and at least one sealing surface (47) is arranged on the bottom side (46) of the sealing ring (43), which sealing surface rests on the slider plate (30) at least in the closed position.

4. A conduit pipe according to claim 1, wherein the sealing seat (40) comprises an at least single-acting, static sealing system which interacts with the slider plate (30).

5. A conduit pipe according to claim 1, wherein the shaped ring (50) is pressed into the circumferential groove (42, 45).

6. A conduit pipe according to claim 1, wherein the sealing seat (40) comprises two concentric circumferential grooves (42, 45) in which one shaped ring (50) each is arranged.

7. A conduit pipe according to claim 1, wherein the shaped ring (50) consists of an O-ring with a gas filling.

8. A conduit pipe according to claim 1, wherein the shaped ring (50) consists of a C-ring with an elastic element arranged therein.

9. A conduit pipe according to claim 1, wherein the conduit slider is formed as a double-plate slider with two parallel slider plates (30).

10. A conduit pipe according to claim 1, wherein the conduit slider is formed as a single-plate slider with a single slider plate (30).

11. A conduit pipe according to claim 1, wherein the gas barrier is a vapour barrier (70).

* * * * *

UNITED STATES PATENT AND TRADEMARK OFFICE
CERTIFICATE OF CORRECTION

PATENT NO. : 9,777,845 B2  
APPLICATION NO. : 15/129106  
DATED : October 3, 2017  
INVENTOR(S) : Krieger et al.

Page 1 of 1

It is certified that error appears in the above-identified patent and that said Letters Patent is hereby corrected as shown below:

In the Claims

Column 9
Line 3, Claim 1 "with media filing is arranged" should read --with media filing is arranged, and--

Signed and Sealed this
Twentieth Day of February, 2018

Andrei Iancu
*Director of the United States Patent and Trademark Office*